United States Patent
Shimada et al.

(10) Patent No.: US 11,012,004 B2
(45) Date of Patent: May 18, 2021

(54) VIBRATION ACTUATOR AND ELECTRONIC DEVICE INCLUDING THE SAME

(71) Applicant: CANON KABUSHIKI KAISHA, Tokyo (JP)

(72) Inventors: Akira Shimada, Saitama (JP); Hiroyuki Seki, Oyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 331 days.

(21) Appl. No.: 16/160,181

(22) Filed: Oct. 15, 2018

(65) Prior Publication Data
US 2019/0123664 A1 Apr. 25, 2019

(30) Foreign Application Priority Data
Oct. 20, 2017 (JP) .............. JP2017-204055

(51) Int. Cl.
| | |
|---|---|
| H02N 2/00 | (2006.01) |
| H02N 2/02 | (2006.01) |
| G02B 7/02 | (2021.01) |
| H02N 2/14 | (2006.01) |
| H02N 2/10 | (2006.01) |
| H02N 2/12 | (2006.01) |

(52) U.S. Cl.
CPC ............. *H02N 2/0015* (2013.01); *G02B 7/02* (2013.01); *H02N 2/0055* (2013.01);
(Continued)

(58) Field of Classification Search
CPC ...... H02N 2/0015; H02N 2/106; H02N 2/123; H02N 2/0055; H02N 2/026; H02N 2/147;
(Continued)

(56) References Cited

U.S. PATENT DOCUMENTS

| | | |
|---|---|---|
| 5,557,157 A | 9/1996 | Shirasaki |
| 2003/0122451 A1* | 7/2003 | Seki .................. H02N 2/106 |
| | | 310/323.01 |

(Continued)

FOREIGN PATENT DOCUMENTS

| | | |
|---|---|---|
| CN | 106062625 A | 10/2016 |
| CN | 205720820 U | 11/2016 |

(Continued)

*Primary Examiner* — Emily P Pham
(74) *Attorney, Agent, or Firm* — Canon U.S.A., Inc. IP Division

(57) ABSTRACT

A vibration actuator includes a vibrator including a shaft, an output transmission member penetrated by the shaft, and configured to rotate about the axis of the shall, and a fixed member configured not to move relative to the shaft and configured to move relative to the output transmission member. The fixed member includes a base portion and a projection portion protruding from the base portion to the output transmission member side, the vibration actuator includes a pressure reception member between the base portion and the output transmission member in an axial direction of the shaft, and wherein the projection portion and the output transmission member are in contact with each other in a direction orthogonal to the axial direction of the shaft, and the projection portion and the output transmission member are not in contact with each other in the axial direction of the shaft.

18 Claims, 7 Drawing Sheets

(52) U.S. Cl.
CPC ........... *H02N 2/0065* (2013.01); *H02N 2/026* (2013.01); *H02N 2/103* (2013.01); *H02N 2/106* (2013.01); *H02N 2/123* (2013.01); *H02N 2/147* (2013.01)

(58) Field of Classification Search
CPC ...... H02N 2/0065; H02N 2/103; H02N 2/006; G02B 7/02
See application file for complete search history.

(56) References Cited

U.S. PATENT DOCUMENTS

| | | | |
|---|---|---|---|
| 2006/0043845 A1* | 3/2006 | Maruyama | H02N 2/106 310/358 |
| 2013/0207516 A1* | 8/2013 | Lee | H02N 2/163 310/323.02 |
| 2014/0043515 A1* | 2/2014 | Nitto | H02N 2/006 348/333.01 |
| 2016/0054540 A1* | 2/2016 | Kogure | G02B 7/026 359/824 |
| 2018/0019689 A1* | 1/2018 | Seki | H02N 2/0045 |
| 2018/0316286 A1* | 11/2018 | Shimada | H02N 2/106 |

FOREIGN PATENT DOCUMENTS

| | | |
|---|---|---|
| EP | 0543360 A1 | 5/1993 |
| JP | 2014017908 A | 1/2014 |
| JP | 2016-013009 A | 1/2016 |
| JP | 2016-182018 A | 10/2016 |
| WO | 2016/153066 A1 | 9/2016 |

\* cited by examiner

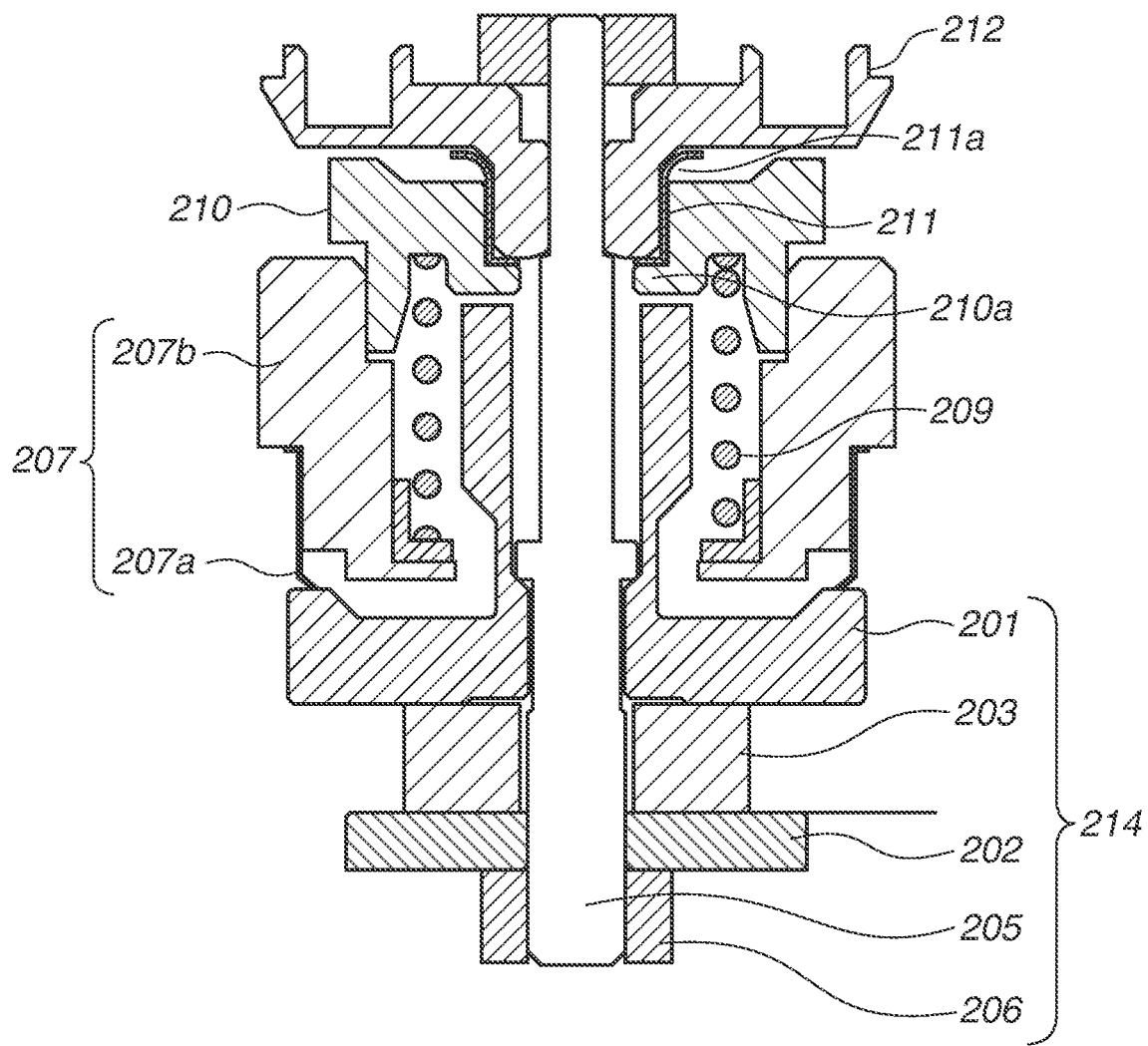

VIBRATION ACTUATOR AND ELECTRONIC DEVICE INCLUDING THE SAME

BACKGROUND OF THE INVENTION

Field of the Invention

The present invention relates to a vibration actuator including a vibrator and a rotating body that is frictionally driven by a vibration excited by the vibrator, and also relates to an electronic device including the vibration actuator.

Description of the Related Art

Generally, a vibration actuator is applied to a product to drive, for example, a camera lens. Japanese Patent Application Laid-Open No. 2016-13009 discusses a rod type vibration actuator.

FIG. 7 is a schematic diagram illustrating the configuration of the conventional rod type vibration actuator. The rod type vibration actuator includes a vibrator 214, which excites driving vibrations. The rod type vibration actuator moves the vibrator 214 and a rotor (rotating body) 207, which is in pressure contact with the vibrator 214, relative to each other by the driving vibrations excited by the vibrator 214.

The vibrator 214 includes at least two elastic bodies 201 and 202, and a piezoelectric element 203, which is held between the elastic bodies 201 and 202. To efficiently vibrate the vibrator 214, the piezoelectric element 203 is tightened so that a predetermined clamping force is applied to the piezoelectric element 203.

Then, electric fields are applied to the piezoelectric element 203 to cause the vibrator 214 to excite two bending vibrations orthogonal to each other, which causes an elliptic motion in the elastic body 201. The rotor 207 is brought into pressure contact with the elastic body 201, which causes the elliptic motion of the elastic body 201 to be transmitted to the rotor 207, as a driving force, in the form of a frictional force between the vibrator 214 and the rotor 207. The rotor 207 includes a contact portion 207a and a rotor main ring 207b. The configuration is such that the rotor 207 is pressurized by a pressure spring 209, to bring the vibrator 214 and the rotor 207 into pressure contact with each other.

A gear 210 receives the reaction force of the pressure force of the pressure spring 209. The gear 210 rotates in synchronization with the rotor 207 while sliding in contact with a flange cap 211, which is press-fitted to a flange 212. If the flange cap 211 is not included, and the flange 212 and the gear 210 are in direct contact with each other, the flange 212 may abrade. Thus, the flange cap 211 is provided to prevent the flange 212 from abrading. This lengthens the life of the flange 212.

Currently, there is a commercial requirement for the vibration actuator discussed in Japanese Patent Application Laid-Open No. 2016-13009 to be further downsized. This is because if the vibration actuator is downsized, a product including the vibration actuator can also be downsized.

Further, the vibration actuator discussed in Japanese Patent Application Laid-Open No. 2016-13009 has a sliding bearing structure in which the gear 210 and the flange cap 211 slide in contact with each other. In such a configuration, the widths of the gap between the gear 210 and the flange cap 211 and the gap between the flange cap 211 and the flange 212 influence the driving performance of the vibration actuator.

Specifically, if the gaps are too small, load increases. If the gaps are too large, the centrifugal whirling of the gear 210 and the rotor 207 becomes large, which causes uneven speed of rotation. Thus, in a configuration in which the flange cap 211 is press-fitted to the flange 212 as in Japanese Patent Application Laid-Open No. 2016-13009, it is necessary to manufacture each of three fitting components, namely the gear 210, the flange cap 211, and the flange 212, with a high degree of dimensional accuracy. Thus, it is not easy to manufacture the vibration actuator.

In view of such conventional art, the present invention is directed to providing a vibration actuator that can be further downsized from the conventional method and is addresses difficulties in manufactured the conventional method.

SUMMARY OF THE INVENTION

According to an aspect of the present invention, a vibration actuator includes a vibrator including a shaft, and an electro-mechanical energy conversion element and an elastic body that are penetrated by the shaft, a rotating body penetrated by the shaft, in contact with the vibrator, and configured to rotate about an axis of the shaft by a vibration of the elastic body, an output transmission member penetrated by the shaft, engaged with the rotating body, and configured to rotate about the axis of the shaft by the rotation of the rotating body, a fixed member configured not to move relative to the shaft and configured to move relative to the output transmission member, and a pressure member configured to press the output transmission member to the fixed member side and press the rotating body to the vibrator side. The fixed member includes a base portion and a projection portion protruding from the base portion to the output transmission member side, the vibration actuator includes a pressure reception member between the base portion and the output transmission member in an axial direction of the shaft, and wherein the projection portion and the output transmission member are in contact with each other in a direction orthogonal to the axial direction of the shaft, and the projection portion and the output transmission member are not in contact with each other in the axial direction of the shaft.

Further features of the present invention will become apparent from the following description of exemplary embodiments with reference to the attached drawings.

BRIEF DESCRIPTION OF THE DRAWINGS

FIG. 7 is a schematic cross-sectional view of a vibration actuator in a conventional example.

DESCRIPTION OF THE EMBODIMENTS

Figure 1:
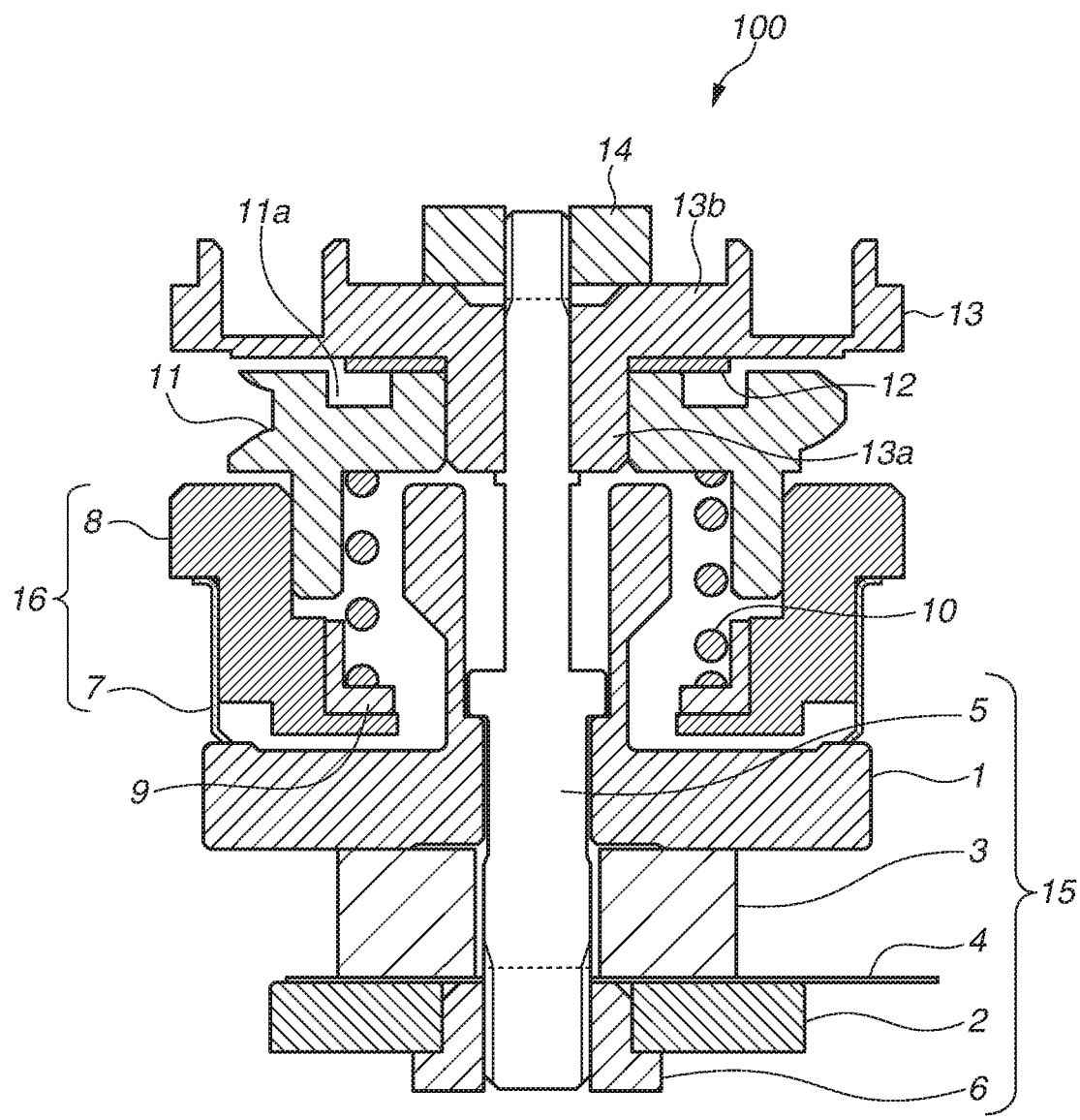
FIG. 1 is a schematic cross-sectional view illustrating a configuration of a vibration actuator according to a first exemplary embodiment.

With reference to FIG. 1, a vibration actuator 100 according to a first exemplary embodiment is described. FIG. 1 is a schematic cross-sectional view illustrating the configuration of the vibration actuator (vibration driving apparatus) 100.

The vibration actuator 100 includes a rotor (rotating body) 16, a rubber 9, a pressure spring (pressure member) 10, a gear (output transmission member) 11, a flange cap (pressure reception member) 12, a flange (fixed member) 13, a first nut 14, and a vibrator 15. The vibration actuator 100 is a rotary vibration actuator.

The vibrator 15 includes a first elastic body 1, a second elastic body 2, a piezoelectric element (electro-mechanical energy conversion element) 3, a flexible printed circuit board 4, a shaft 5, and a second nut 6, In this case, a plurality of members included in the vibration actuator 100 is penetrated by the shaft 5. The plurality of members penetrated by the shaft 5 may include at least the rotating body 16, the output transmission member (gear) 11, the first elastic body 1, and the electro-mechanical energy conversion element (piezoelectric element) 3. Further, the shaft 5 and the fixed member (flange) 13 may be independent members, or may form an integrated member. In the following description, in the vibration actuator 100, the first nut 14 side is referred to as an "upper side", and the second nut 6 side is referred to as a "lower side", Thus, in the following description, the first nut 14 will occasionally be referred to as the "upper nut 14", and the second nut 6 will occasionally be referred to as the "lower nut 6". The first elastic body 1, the second elastic body 2, the piezoelectric element 3, and the flexible printed circuit board 4 are tightened with the shaft 5 and the lower nut 6 so that a predetermined clamping force (compressive force) is applied to these components, whereby the vibrator 15 having a rod shape is formed.

In the piezoelectric element 3, electrode groups (an A-phase and a B-phase), each including two electrodes, are provided. If a power supply (not illustrated) applies alternating electric fields different in phase from each other to the electrode groups via the flexible printed circuit board 4, two bending vibrations orthogonal to each other are excited by the vibrator 15. The spatial phases about the axial direction of these two vibration modes are shifted by 90 degrees from each other. Thus, the phases of the applied alternating electric fields are adjusted, whereby it is possible to impart a temporal phase difference of 90 degrees to the two bending vibrations. As a result, the bending vibrations of the vibrator 15 rotate about the axis, and an elliptic motion occurs on the first elastic body 1. The driving principle of the vibration actuator 100 is similar to that in the conventional art and discussed in the publication of Japanese Patent Application Laid-Open No. 201613009, for example.

The piezoelectric element 3 may be a laminated piezoelectric element formed by alternately laminating and simultaneously sintering a plurality of piezoelectric layers and electrode layers, or may be configured by laminating a plurality of single-plate piezoelectric elements and holding the plurality of single-plate piezoelectric elements between elastic bodies. Further, in a part of the A-phase of the piezoelectric element 3, a sensor phase is provided for causing distortion by the bending vibrations of the vibrator 15, generating an electric charge by a direct piezoelectric effect, and detecting the electric charge, to monitor the vibration state of the vibrator 15. At the frequency at this time, the phase difference relationship between the voltage applied to the piezoelectric element 3 in the A-phase and an output signal of the sensor phase is 90 degrees at the resonant frequency and gradually shifts at frequencies higher than the resonant frequency. Thus, the value of the phase difference is detected when vibrations are imparted, whereby it is possible to monitor the relationship between the input frequency and the resonant frequency of a vibrating body and stably drive the vibrating body.

The rotor 16 includes a contact portion (sliding contact member) 7 and a rotor main ring 8, The surface on the vibrator 15 side (the lower side) of the contact portion 7 is in contact with the surface on the upper side of the first elastic body 1. The contact portion 7 has a structure with a small contact area and moderate spring properties. The rotor main ring 8 supports the contact portion 7, and the rotor main ring 8 and the contact portion 7 rotate in an integrated manner.

It is desirable that the material of the contact portion 7 should be stainless steel, which has abrasion resistance, strength, and corrosion resistance. It is more desirable that the material of the contact portion 7 should be SUS420J2. The contact portion 7 may be manufactured by lathing or a three-dimensional (3D) printer, or may be manufactured by stamping, Stamping is desirable in terms of manufacturing accuracy and cost. The contact portion 7 is fixed to the rotor main ring 8 by bonding with a resin adhesive, metal brazing such as soldering, welding such as laser welding or resistance welding, press fit, or mechanical joining such as caulking.

The rotor main ring 8 is pressurized against the vibrator 15 via the rubber 9 by the pressure spring 10 as a pressure member. The pressure spring 10 is placed between the gear 11 and the rotor 16. The rotor main ring 8 is thus pressurized, whereby the gear (output transmission member) 11 is pressed by the flange cap 12 (to the fixed member (flange) 13 side), Then, the position in the thrust direction of the gear 11 is determined, and the rotor 16 is pressed to the lower side (the first elastic body 1 side of the vibrator 15). Thus, a frictional force occurs between the contact portion 7 and the first elastic body 1 (the vibrator 15), and the contact portion 7 can be rotated about the axis of the shaft 5 by the above elliptic motion excited in the first elastic body 1. As described above, the rotor 16 is frictionally driven by the vibrations of the vibrator 15. The rubber 9 serves to equalize the pressure force of the pressure spring 10.

The gear 11 is placed on the upper side of the rotor main ring 8. On the upper surface of the rotor main ring 8, a recessed portion is formed on the inner circumferential side of the rotor main ring 8. The recessed portion provided on the upper side of the rotor main ring 8 and a protruding portion provided on the lower side of the gear 11 are engaged with each other, whereby the gear 11 rotates together with the rotor main ring 8 about the axis of the shaft 5 by the rotation of the rotor 16 (the rotor main ring 8). Then, the gear 11 transmits the output of the vibration actuator 100 to outside. On the surface on the upper side of the gear 11 opposed to a base portion 13b, a groove portion 11a along the circumferential direction of the gear 11 is provided. The groove portion 11a is provided, whereby it is possible to improve the molding accuracy of the gear 11. Further, the groove portion 11a is provided, whereby it is possible to adjust the sliding contact area of a sliding contact surface between the surface of the gear 11 further on the inner circumferential side than the groove portion 11a, and the flange cap 12. Thus, it is possible to equalize the sliding contact area. Although the sliding contact area can also be adjusted by making the flange cap 12 small, it is more desirable to adjust the sliding contact area using the groove portion 11a because higher assembly yield is achieved.

It is desirable that the material of the gear 11 should be a material satisfying strength and abrasion resistance. In the present exemplary embodiment, a resin containing reinforcement fibers is used. Further, it is desirable to adjust the base material and the reinforcement fibers of the resin so that the linear expansion coefficients of the gear 11 and the flange 13 are equivalent to each other.

The vibrator 15 is fixed to the flange (fixed member) 13 as a fixed member with the shaft 5 and the upper nut 14 (the fixed member 13 is fixed to the shaft 5 and does not move relative to the shaft 5). The flange 13 is a member for attaching the vibration actuator 100 to an external member (not illustrated) such as a frame of a device on which the vibration actuator 100 is mounted. The flange 13 is fixed at a predetermined position in the thrust direction of the shaft 5 with the upper nut 14. If the vibration actuator 100 is driven, the rotor 16 and the gear (output transmission member) 11 are rotated by the vibrations of the vibrator 15 and move relative to the shaft 5, the flange (fixed member) 13, and the vibrator 15.

The flange 13 includes a projection portion 13a, which protrudes downward on the inner circumferential side of the flange 13, and the base portion 13b, which is perpendicular to the axis of the shaft 5. The projection portion 13a is provided, whereby it is possible to extend the fitting length between the flange 13, the shaft 5, and the gear 11. The outer peripheral surface of the projection portion 13a and the inner peripheral surface of the gear 11 slide in contact with each other, which serves as a sliding bearing. Since the shape of the flange 13 is relatively complex, it is desirable to manufacture the flange 13 by a method such as resin molding, zinc die casting, aluminum die casting, or metal sintering. In the present exemplary embodiment, the flange 13 is manufactured in view of the balance between dimensional accuracy, cost, and strength.

If the gap between the outer peripheral surface of the projection portion 13a and the inner peripheral surface of the gear 11 is too small, sliding load increases. If the gap is too large, the centrifugal whirling of the rotor main ring 8 becomes large, which causes uneven speed. Thus, it is desirable to manage an appropriate value of the gap.

The flange cap 12 is supported by the flange 13 and placed between the gear 11 and the base portion 13b. The flange cap 12 is a pressure reception member for receiving a pressure force against the base portion 13b. It is desirable that the hardness of the flange cap 12 should be higher than the hardness of the flange 13. It is desirable to fix the flange cap 12 to the flange 13 with an adhesive. It is desirable that the material of the flange cap 12 should be a material having abrasion resistance. Specific examples of the material include stainless steel. In a case where stainless steel is used, it is more desirable to manufacture the flange cap 12 by stamping because the dimensional accuracy and the productivity are high. The surface on the output transmission member side (the gear 11 side or the lower side) of the flange cap 12 is in contact with the inner circumferential side of the surface on the upper side of the gear 11. A contact surface between the flange cap 12 and the gear 11 is a sliding contact surface. Thus, it is desirable that the coefficient of friction of the sliding contact surface should be small.

In the present exemplary embodiment, if the flange cap 12 is not provided, the surface on the lower side of the base portion 13b of the flange 13 is in direct contact with the gear 11. The flange 13 receives the pressure force of the pressure spring 10 in the thrust direction. Thus, the surface on the lower side of the flange 13 abrades by the rotation of the gear 11. To reduce such abrasion, the flange cap 12 is placed between the flange 13 and the gear 11 in the thrust direction. On the other hand, in the radial direction (a direction orthogonal to the axial direction of the shaft 5), the side surface (a surface parallel to the axis of the shaft 5) of the projection portion 13a of the flange 13 is in contact with the gear 11 (the projection portion 13a is in contact with the output transmission member (gear) 11). The projection portion 13a (which is not in contact with the output transmission member (gear) 11 in the axial direction of the shaft 5) only receives a side force from the gear 11. The side force from the gear 11 is sufficiently smaller than surface pressure that promotes abrasion. Thus, the projection portion 13a can slide in direct contact with the gear 11.

Conventionally, a pressure force is received between the surface on the lower side of a projection portion of the flange 212 and a pressure reception portion 210a of the gear 210 via the flange cap 211. In contrast, in the vibration actuator 100 according to the present exemplary embodiment, the flange cap 12 is placed between the surface on the lower side of the base portion 13b of the flange 13 and the gear 11 and receives the pressure force of the pressure spring 10 at this position. Thus, it is not necessary to provide the pressure reception portion 210a of the gear 210 and an R-portion 211a of the flange cap 211 as in the conventional method. As a result, based on the vibration actuator 100 according to the present exemplary embodiment, it is possible to downsize the vibration actuator 100 in the axial direction.

In a case where the flange cap 211 is press-fitted to the flange 212 as in the conventional vibration actuator illustrated in FIG. 7, three components, namely the flange 212, the flange cap 211, and the gear 210, fit each other. Thus, the tolerances of the three components, namely the flange 212, the flange cap 211, and the gear 210, influence the driving performance of the vibration actuator. Thus, it is cumbersome to manage dimensions. On the other hand, based on the vibration actuator 100 according to the present exemplary embodiment, fitting members that fit each other in the radial direction are two components, namely the gear 11 and the flange 13. Thus, it is easier to control the distance between fitting members than the conventional method. Further, it is also easier to manage the dimensions of fitting members than the conventional method. Thus, the vibration actuator 100 can be manufactured more easily than the conventional method.

Figure 2A:
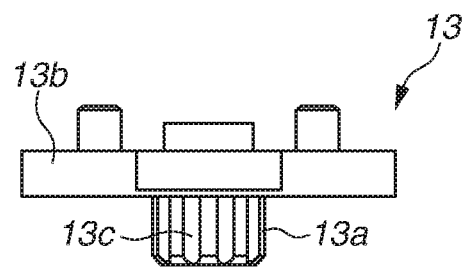
FIGS. 2A and 2B are schematic diagrams illustrating a configuration of a flange according to the first exemplary embodiment.
Figure 2B:
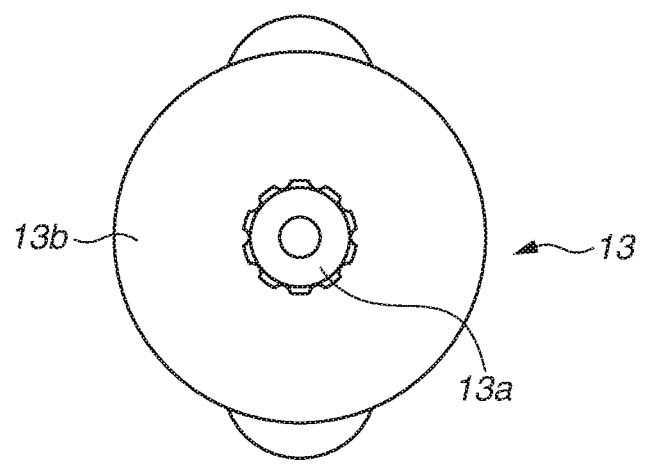

With reference to FIGS. 2A and 2B, the configuration of the flange 13 is described. FIG. 2A is a schematic side view of the flange 13. FIG. 2B is a schematic diagram of the flange 13 as viewed from the lower side. On the side surface of the projection portion 13a of the flange 13, which forms a sliding contact surface with the gear 11, a plurality of grooves 13c along the thrust direction is provided. The plurality of grooves 13c is provided, whereby it is possible to reduce the sliding contact area between the gear 11 and the side surface of the projection portion 13a, Thus, it is possible to reduce sliding loss due to the frictional force between the gear 11 and the side surface of the projection portion 13a, Conventionally, the flange cap 211 having a cup shape, which is manufactured by deep drawing using a press, is used. Thus, it is difficult to form a groove on the side surface of the flange cap 211. With a configuration in which the flange cap 12 having a plate shape is used and the side surface of the flange 13 and the gear 11 are in contact with each other in the radial direction as in the present exemplary embodiment, at least one of the flange 13 and the gear 11 forming a sliding contact surface is worked, whereby it is possible to easily reduce sliding loss.

As described above, according to the present exemplary embodiment, it is possible to provide the vibration actuator 100 that can be more downsized than the conventional method and is manufactured more easily than the conventional method. Further, according to the vibration actuator 100, it is possible to reduce sliding loss due to sliding between the gear 11 and the flange 13 more than the conventional method.

Figure 3A:
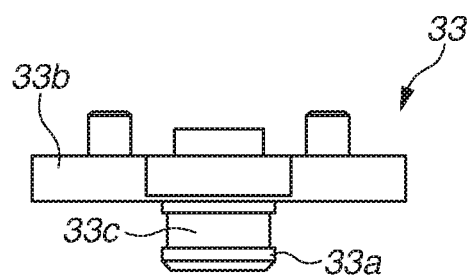
FIGS. 3A and 3B are schematic diagrams illustrating a configuration of a flange according to a second exemplary embodiment.
Figure 3B:
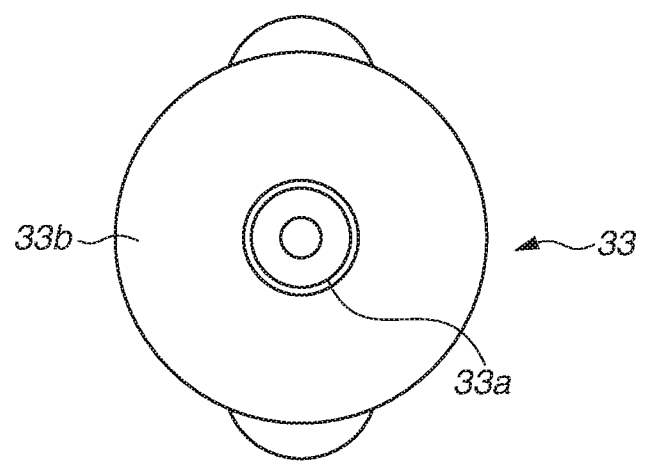

In a second exemplary embodiment, a flange 33 illustrated in FIGS. 3A and 3B is used instead of the flange 13 according to the first exemplary embodiment. Components other than the flange 33 are similar to those of the first exemplary embodiment, and therefore are not described in detail here. FIGS. 3A and 3B are schematic diagrams illustrating the configuration of the flange 33 according to the present exemplary embodiment.

The flange 33 includes a projection portion 33a and a base portion 33b. In the projection portion 33a, a groove portion 33c along the circumferential direction of the projection portion 33a is provided. The groove portion 33c is provided, whereby it is possible to reduce the sliding contact area between the gear 11 and the side surface of the projection portion 33a, Thus, it is possible to reduce sliding loss due to the frictional force between the gear 11 and the side surface of the projection portion 33a. As described above, with a configuration in which the flange cap 12 having a plate shape is used and the side surface of the flange 33 and the gear 11 are in contact with each other in the radial direction, at least one of the flange 33 and the gear 11 forming a sliding contact surface is worked, whereby it is possible to easily reduce sliding loss.

As described above, according to the present exemplary embodiment, it is possible to provide a vibration actuator that can be more downsized than the conventional method and is manufactured more easily than the conventional method. Further, based on the vibration actuator according to the present exemplary embodiment, it is possible to reduce sliding loss due to sliding between the gear 11 and the flange 33 more than the conventional method.

Figure 4:
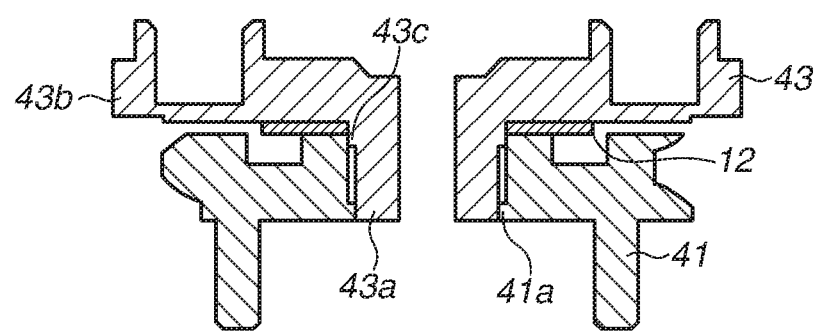
FIG. 4 is a schematic cross-sectional view illustrating configurations of a flange and a gear according to a third exemplary embodiment.

With reference to FIG. 4, the configuration of a third exemplary embodiment is described, FIG. 4 is a schematic cross-sectional view illustrating the configurations of a gear 41 and a flange 43 according to the present exemplary embodiment. In the present exemplary embodiment, the flange 43 illustrated in FIG. 4 is used instead of the flange 13 according to the first exemplary embodiment. Further, the gear 41 illustrated in FIG. 4 is used instead of the gear 11 according to the first exemplary embodiment, Components other than the gear 41 and the flange 43 are similar to those of the first exemplary embodiment, and therefore are not described in detail here.

In the gear 41, the side surface of a through-hole penetrated by the shaft 5 has two steps. The inner diameter of the through-hole on the lower side in the thrust direction is larger, and the inner diameter of the through-hole on the upper side in the thrust direction is smaller. In other words, in the gear 41, a protruding portion 41a is provided, which protrudes to a projection portion 43a side of the flange 43 and where the inner diameter of the through-hole is relatively smaller than another portion of the through-hole. The protruding portion 41a is placed further on the lower side in the thrust direction than a portion where the inner diameter of the through-hole is relatively larger than the protruding portion 41a (placed at a position further away from a base portion 43b than this portion).

Further, the side surface of the projection portion 43a of the flange 43 also has two steps. The outer diameter of the projection portion 43a on the upper side in the thrust direction is larger, and the outer diameter of the projection portion 43a on the lower side in the thrust direction is smaller. In other words, in the projection portion 43a of the flange 43, a protruding portion 43c where the outer diameter of the projection portion 43a is relatively larger than another portion of the projection portion 43a is provided on the base portion side (the base portion 43b side) in the thrust direction.

In the present exemplary embodiment, the protruding portion 41a of the gear 41 and the projection portion 43a slide in contact with each other. Further, the gear 41 and the protruding portion 43c of the projection portion 43a slide in contact with each other. Then, between the above two sliding contact portions, there is a space where the gear 41 and the projection portion 43a are not in contact with each other. As a result, it is possible to further reduce the sliding contact area and reduce sliding loss.

As described above, according to the present exemplary embodiment, it is possible to provide a vibration actuator that can be more downsized than the conventional method and is manufactured more easily than the conventional method. Further, based on the vibration actuator according to the present exemplary embodiment, it is possible to reduce sliding loss due to sliding between the gear 41 and the flange 43 more than the conventional method.

Figure 5:
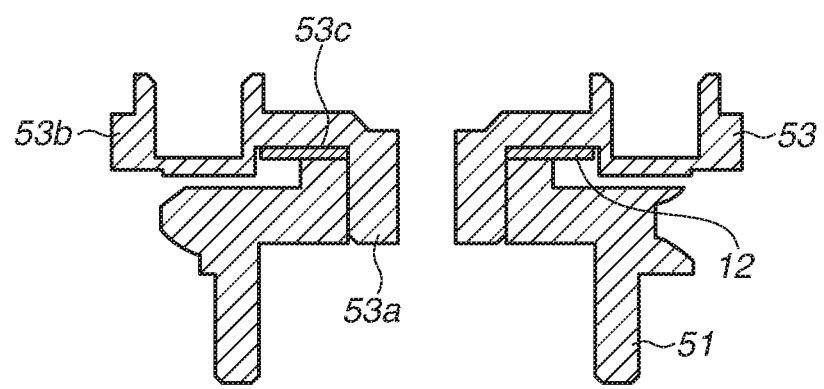
FIG. 5 is a schematic cross-sectional view illustrating configurations of a flange and a gear according to a fourth exemplary embodiment.

With reference to FIG. 5, the configuration of a fourth exemplary embodiment is described. FIG. 5 is a schematic cross-sectional view illustrating the configurations of a flange 53 and a gear 51 according to the present exemplary embodiment. In the present exemplary embodiment, the flange 53 illustrated in FIG. 5 is used instead of the flange 13 according to the first exemplary embodiment. Further, the gear 51 illustrated in FIG. 5 is used instead of the gear 11 according to the first exemplary embodiment. Components other than the gear 51 and the flange 53 are similar se of the first exemplary embodiment, and therefore are not described in detail here.

The flange 53 according to the present exemplary embodiment includes a projection portion 53a and a base portion 53b. On the surface of the base portion 53b on the lower side in the thrust direction, a recessed portion 53c is provided, which is recessed to the upper side in the thrust direction. Then, in the recessed portion 53c, the flange cap 12 is placed in contact with the flange 53. With such a configuration, it is possible to reduce the length in the thrust direction of the vibration actuator and further downsize the vibration actuator.

To prevent the inclination of the vibration actuator, it is desirable that the thickness in the thrust direction of the base portion 53b of the flange 53 should be constant, and the stiffness of the flange 53 should be in a desired range. In the present exemplary embodiment, the thickness of a portion with which the flange cap 12 in contact is made small, and further, a nut (not illustrated) is placed above this portion, Thus, a decrease in the stiffness due to a reduction in the thickness is small.

If the length of the bearing is too small, the gear 51 may fall over, and the transmission of power may become unstable. Conversely, if the length of the bearing is too great, sliding loss increases. According to the present exemplary embodiment, however, it is possible to control the length of the bearing by adjusting the thickness of the base portion 53b.

As described above, according to the present exemplary embodiment, it is possible to provide a vibration actuator that can be more downsized than the conventional method and is manufactured more easily than the conventional method. Further, it is possible to shorten the whole of the vibration actuator in the thrust direction while maintaining the length of the bearing.

Figure 6:
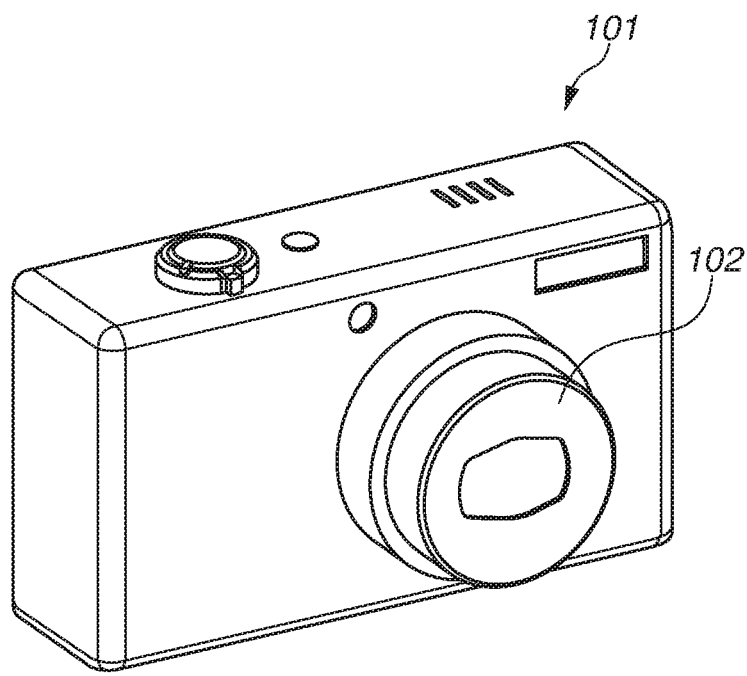
FIG. 6 is a schematic perspective view illustrating a configuration of a digital camera according to a fifth exemplary embodiment.

In a fifth exemplary embodiment, with reference to FIG. 6, a description is given of an imaging apparatus, which is an example of an electronic device including each of the above vibration actuators. FIG. 6 is a perspective view illustrating the general structure of a digital camera 101, which is an example of the imaging apparatus.

To the front surface of the digital camera 101, a lens barrel 102 is attached. Within the lens barrel 102, an optical lens group (not illustrated) movable in the optical axis direction is placed. The vibration actuator 100 according to the first exemplary embodiment is a driving unit connected via a gear train (not illustrated) to the lens group placed in the lens barrel 102. The vibration actuator 100 is driven, whereby the lens group of the lens barrel 102 is driven. That is, the lens group is a driven unit to be driven by the vibration actuator 100. For example, the vibration actuator 100 can be optionally used to drive a zoom lens and/or drive a focus lens.

While desirable exemplary embodiments of the present invention have been described, the present invention is not limited to these exemplary embodiments, but can be modified and changed in various manners within the scope of the present invention. Further, the configurations of the above exemplary embodiments may be combined with each other within the scope of the present invention.

For example, the configurations of the first to third exemplary embodiments may be combined with the configuration of the fourth exemplary embodiment.

Further, in each of the above exemplary embodiments, the vibration actuator is fixed to the flange. Further, a reduction gear to be meshed with the gear 11 or an encoder for reading the driving speed of the vibration actuator may be provided on the flange.

According to a vibration actuator as an aspect of the present invention, it is possible to provide a vibration actuator that can be more downsized than a conventional method and is manufactured more easily than the conventional method.

While the present invention has been described with reference to exemplary embodiments, it is to be understood that the invention is not limited to the disclosed exemplary embodiments.

This application claims the benefit of Japanese Patent Application No. 2017-204055, filed Oct. 20, 2017, which is hereby incorporated by reference herein in its entirety.

What is claimed is:

1. A vibration actuator comprising:
   a vibrator including a shaft, an electro-mechanical energy conversion element, and an elastic body that are penetrated by the shaft;
   a rotating body penetrated by the shaft, in contact with the vibrator, and configured to rotate about an axis of the shaft by a vibration of the elastic body;
   an output transmission member penetrated by the shaft, engaged with the rotating body, and configured to rotate about the axis of the shaft by the rotation of the rotating body;
   a fixed member configured not to move relative to the shaft and configured to allow the output transmission member to move relative to the fixed member; and
   a pressure member configured to press the output transmission member toward the fixed member and press the rotating body toward the vibrator;
   wherein the fixed member includes a base portion and a projection portion protruding from the base portion along the output transmission member, and
   wherein the vibration actuator includes a pressure reception member between the base portion and the output transmission member in an axial direction of the shaft, and the base portion is pressed indirectly by the pressure member, with the output transmission member and the pressure reception member disposed therebetween.

2. The vibration actuator according to claim 1,
   wherein the projection portion is provided on an inner circumferential side of the base portion, and
   wherein the shaft penetrates the projection portion.

3. The vibration actuator according to claim 1, wherein a groove portion along the axial direction of the shaft is provided on a side surface of the projection portion.

4. The vibration actuator according to claim 3, wherein the groove portion provided on the side surface of the projection portion includes a plurality of grooves.

5. The vibration actuator according to claim 1, wherein on a side surface of the projection portion, a groove portion along a circumferential direction of the side surface of the projection portion is provided.

6. The vibration actuator according to claim 1,
   wherein in the projection portion, a protruding portion where an outer diameter of the projection portion is relatively larger than another portion of the projection portion is provided, and
   wherein the protruding portion of the projection portion is in contact with the output transmission member.

7. The vibration actuator according to claim 6, wherein the protruding portion of the projection portion is provided at a position closer to the base portion in the axial direction of the shaft than said another portion where the outer diameter of the projection portion is relatively smaller than the protruding portion of the projection portion.

8. The vibration actuator according to claim 1,
   wherein in the output transmission member, a protruding portion where an inner diameter of a through-hole included in the output transmission member and penetrated by the shaft is relatively smaller than another portion of the through-hole is provided, and
   wherein the protruding portion of the output transmission member is in contact with a part of a side surface of the projection portion.

9. The vibration actuator according to claim 8, wherein the protruding portion of the output transmission member is provided at a position further away from the base portion in the axial direction of the shaft than said another portion where the inner diameter of the through-hole is relatively larger than the protruding portion of the output transmission member.

10. The vibration actuator according to claim 1,
    wherein in the base portion, a recessed portion is provided on a surface on the output transmission member side of the base portion, and
    wherein the pressure reception member is placed in the recessed portion.

11. The vibration actuator according to claim 1, wherein hardness of the pressure reception member is higher than hardness of the fixed member.

12. The vibration actuator according to claim 1, wherein on a surface of the output transmission member opposed to the base portion, a recessed portion along a circumferential direction of the surface is provided.

13. The vibration actuator according to claim 1, wherein the shaft and the fixed member are independent members.

14. The vibration actuator according to claim 1, wherein the projection portion receives a side force from the output transmission member.

15. The vibration actuator according to claim 1, wherein the projection portion and the output transmission member are in contact with each other in a direction orthogonal to the axial direction of the shaft.

16. The vibration actuator according to claim 1, wherein the projection portion and the output transmission member are not in contact with each other in the axial direction of the shaft.

17. An electronic device comprising:
a vibration actuator; and
a driven unit configured to be driven by driving of the vibration actuator,
wherein the vibration actuator comprises:
a vibrator including a shaft, an electro-mechanical energy conversion element, and an elastic body that are penetrated by the shaft;
a rotating body penetrated by the shaft, in contact with the vibrator, and configured to rotate about an axis of the shaft by a vibration of the elastic body;
an output transmission member penetrated by the shaft, engaged with the rotating body, and configured to rotate about the axis of the shaft by the rotation of the rotating body;
a fixed member configured not to move relative to the shaft and configured to allow the output transmission member to move relative to the fixed member; and
a pressure member configured to press the output transmission member toward the fixed member and press the rotating body toward the vibrator;
wherein the fixed member includes a base portion and a projection portion protruding from the base portion along the output transmission member, and
wherein the vibration actuator includes a pressure reception member between the base portion and the output transmission member in an axial direction of the shaft, and the base portion is pressed indirectly by the pressure member, with the output transmission member and the pressure reception member disposed therebetween.

18. The electronic device according to claim 17, wherein an optical lens is provided in the driven unit.

\* \* \* \* \*